(12) United States Patent
Webber

(10) Patent No.: US 10,647,151 B2
(45) Date of Patent: May 12, 2020

(54) VEHICLE LOGO-RIM APPARATUS AND A METHOD OF MAKING SAME

(71) Applicant: Kimel Webber, Wallkill, NY (US)

(72) Inventor: Kimel Webber, Wallkill, NY (US)

( * ) Notice: Subject to any disclaimer, the term of this patent is extended or adjusted under 35 U.S.C. 154(b) by 129 days.

(21) Appl. No.: 15/727,594

(22) Filed: Oct. 7, 2017

(65) Prior Publication Data
US 2019/0105942 A1    Apr. 11, 2019

(51) Int. Cl.
*B60B 3/00* (2006.01)
*B60B 7/00* (2006.01)
*B21D 53/30* (2006.01)

(52) U.S. Cl.
CPC .............. *B60B 3/002* (2013.01); *B60B 3/007* (2013.01); *B60B 7/008* (2013.01); *B60B 7/0013* (2013.01); *B60B 7/0053* (2013.01); *B21D 53/30* (2013.01); *B60B 2900/572* (2013.01)

(58) Field of Classification Search
CPC ... B60B 3/002; B60B 7/008; B60B 2900/572; B21D 53/30
USPC ..................................................... 301/63.101
See application file for complete search history.

(56) References Cited

U.S. PATENT DOCUMENTS

| 5,316,376 | A | 5/1994 | Defreitas | |
|---|---|---|---|---|
| 5,464,276 | A | 11/1995 | Ott | |
| 7,530,643 | B1 * | 5/2009 | Walker | B60B 7/16 301/37.21 |
| 7,562,939 | B2 * | 7/2009 | Zanin | B60B 7/14 301/37.102 |
| 2005/0206219 | A1 | 9/2005 | Johnson | |
| 2007/0182240 | A1 * | 8/2007 | Zanin | B60B 7/14 301/37.373 |
| 2011/0309670 | A1 * | 12/2011 | Taylor | B60B 3/10 301/64.101 |
| 2014/0152078 | A1 * | 6/2014 | Noriega | B60B 1/06 301/37.26 |
| 2014/0292062 | A1 * | 10/2014 | Luzanilla | B60B 3/002 301/64.101 |

* cited by examiner

*Primary Examiner* — S. Joseph Morano
*Assistant Examiner* — Jean W Charleston
(74) *Attorney, Agent, or Firm* — Aziz M. Ashan; Ahsan & Associates, PLLC

(57) ABSTRACT

The present invention relates generally to the field of vehicle rims, and more specifically relates to Logo-Rims. The present invention also relates to a vehicle Logo-Rim apparatus, and a method of making same. More particularly, the invention encompasses a customized tire rim for a vehicle. The invention also provides a user to replace their existing tire rims with the inventive customized vehicle rim having, and using a customized or a personalized logo. A line of specially designed tire rims that are adorned with a variety of striking designs, sporting logos germane to sports, businesses, and popular culture, is also disclosed. The invention also provides an inventive design which is intended to provide automobile enthusiasts with an attractive alternative to ordinary tire rims.

11 Claims, 3 Drawing Sheets

VEHICLE LOGO-RIM APPARATUS AND A METHOD OF MAKING SAME

FIELD OF THE INVENTION

The present invention relates generally to the field of vehicle rims, and more specifically relates to Logo-Rims. The present invention also relates to a vehicle Logo-Rim apparatus, and a method of making same. More particularly, the invention encompasses a customized tire rim for a vehicle. The invention also provides a user to replace their existing tire rims with the inventive customized vehicle rim having, and using a customized or a personalized logo. A line of specially designed tire rims that are adorned with a variety of striking designs, sporting logos germane to sports, businesses, and popular culture, is also disclosed. The invention also provides an inventive design which is intended to provide automobile enthusiasts with an attractive alternative to ordinary tire rims.

BACKGROUND INFORMATION

Vehicle rims have been used in the automotive industry for its inception and these rims on which a tire is mounted come in many round shapes, widths, radial sizes, and other physical features and attributes. These vehicle tire rims are mostly made of a metal or a metal alloy, and on which a vehicle tire is mounted.

Many individuals drive vehicles to and from work and for pleasure. Many individuals like to fix their "ride" to match their personal taste(s). Whether by ordering personalized license plates, attaching fancy mud flaps to the rear tires, installing floating neon lights along the car's undercarriage or airbrushing elaborate designs upon the car's hood and trunk, customizing one's vehicle is truly an exciting and artistic way in which to express oneself. An extremely popular way in which people revamp the overall appearance of their cars, trucks, and vans, is by installing a new set of tires. Many times the OEM rims on which the tires are mounted may not suit the rest of the vehicle. Many consumers do not find individuality in OEM rims and as such desire an alternative option.

Various attempts have been made to solve problems found in the rim art, and following prior art is representative of some of the current innovations in the vehicle rim art.

U.S. Pat. No. 5,316,376 (Manuel P. Defreitas), the entire disclosure of which is incorporated herein by reference, discloses a vehicle wheel cover adapted to clip on to a wheel rim wherein the wheel cover includes as an element thereof a disc, bearing decorative indicia, which may include a mounted photograph or artwork, and a superposed convex lens to magnify such indicia when viewed from a position exterior of the vehicle to which it may be attached.

U.S. Pat. No. 5,464,276 (Roderick L. Ott), the entire disclosure of which is incorporated herein by reference, discloses a wheel cover assembly for attachment to a vehicle wheel including a rim and a rim center includes a cover plate and securement mechanisms for securing the cover plate over the wheel rim. The cover plate includes opposite inner and outer faces, and the outer face bears indicia which may personalize the vehicle with which the cover assembly is utilized. In addition, the cover plate is positionable adjacent the rim of a vehicle wheel so that when the plate is positioned adjacent the rim, the inner face of the plate faces the rim. The securement mechanisms include tension members which are connectable to the vehicle wheel rim and which span at least a fraction of the rim when connected thereto. Moreover, the tension members have legs whose lengths are adjustable to accommodate the attachment of the securement means to wheel rims at locations thereon wherein the distance that the attachment locations of one of such wheel rims is spaced from its corresponding rim center is different from the distance that the attachment locations of the other of such wheel rims is spaced from its corresponding wheel center.

U.S. Patent Publication No. 20050206219 (Peter J. Johnson), the entire disclosure of which is incorporated herein by reference, discloses a wheel for an automotive vehicle that has a hub for mounting to an axle of the automotive vehicle. A rim is disposed radially outward from the hub and being configured for receiving a tire. A support structure extends between the hub and the rim. The hub, rim and support structure each have an outer face. The outer face of at least one of the hub, rim and support structure has formed thereon monetary indicia.

None of the above inventions and patents, taken either singly or in combination, is seen to describe the invention as claimed. Thus, a need exists for a reliable Logo-Rim to avoid the above-mentioned problems.

Additionally, in view of the foregoing disadvantages inherent in the known tire rim art, the present invention provides a novel Logo Rim. The general purpose of the present invention, which will be described subsequently in greater detail, is to provide a line of specially designed vehicle tire rim that are adorned with a variety of striking designs, sporting logos germane to sports, businesses, and popular culture. The design intent is to provide automobile enthusiasts with an attractive alternative to ordinary tire rims. The features of the invention which are believed to be novel are particularly pointed out and distinctly claimed in the concluding portion of the specification. These and other features, aspects, and advantages of the present invention will become better understood with reference to the ensuing drawings and detailed description.

Furthermore, this invention improves on the deficiencies of the prior art and provides an inventive vehicle Logo-Rim apparatus, and a method of making same.

PURPOSES AND SUMMARY OF THE INVENTION

The invention is a novel vehicle Logo-Rim apparatus, and a method of making same.

One purpose of this invention is to provide a tire rim that has at least one customized or personalized feature.

Another purpose of this invention is to provide a customized or personalized tire rim that can easily replace any other tire rim.

Yet another purpose of this invention is to provide a customized or personalized tire rim that has at least one logo plug to cover a vehicle hub, and to provide continuity to the customized or personalized logo.

Therefore, in one aspect this invention comprises a wheel for an automotive vehicle, comprising:
(a) a tire rim hub having a central opening for mounting to an axle of an automotive vehicle via a wheel hub;
(b) a tire rim disposed radially outward from said tire rim hub and being configured for receiving a tire on its peripheral external radial wall surface;
(c) at least one support structure extending between said tire rim hub and a peripheral internal radial wall surface of said tire rim, and wherein said at least one support structure is in physical contact and secured to said peripheral internal radial wall surface of said tire rim at at least two different locations; and (d) wherein at least an external portion of said at least one support structure is configured to represent at least one logo.

In another aspect this invention comprises a method of forming a wheel for an automotive vehicle, comprising the steps of:

(a) forming a tire rim hub having a central opening for mounting to an axle of an automotive vehicle via a wheel hub;

(b) forming a tire rim having a peripheral external radial surface and a peripheral internal radial surface, wherein at least a portion of said peripheral internal radial surface of said tire rim is connected radially to at least a portion of said tire rim hub via at least one support structure, and wherein said tire rim is configured for receiving a tire on its peripheral external radial surface;

(c) said at least one support structure extending between said tire rim hub and said peripheral internal radial surface of said tire rim is connected at at least two different locations; and (d) wherein at least an external portion of said at least one support structure is configured to represent at least one logo.

In yet another aspect this invention comprises a wheel for an automotive vehicle, comprising:

(a) a tire rim hub having a central opening for mounting to an axle of an automotive vehicle via a wheel hub;

(b) a tire rim disposed radially outward from said tire rim hub and being configured for receiving a tire on its peripheral external radial wall surface;

(c) at least one mini-rim ring disposed radially within an internal surface of said tire rim;

(d) at least one support structure extending between said tire rim hub and a peripheral internal radial wall surface of said tire rim, and wherein said at least one support structure is in physical contact and secured to a peripheral internal radial wall surface of said at least one mini-rim ring at at least two different locations; and (e) wherein at least an external portion of said at least one support structure is configured to represent at least one logo.

BRIEF DESCRIPTION OF THE DRAWINGS

The invention may best be further understood by reference to the ensuing detailed description in conjunction with the drawings in which.

DETAILED DESCRIPTION

Figure 1A:
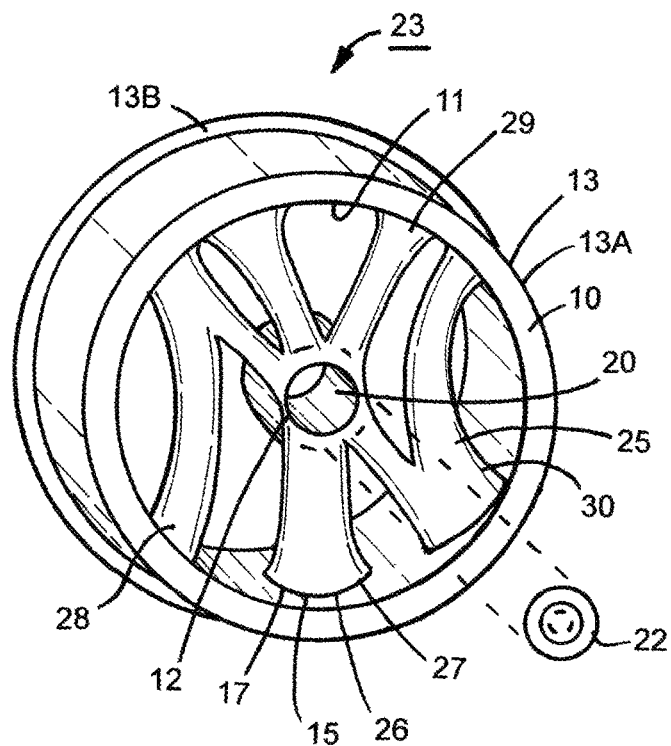
FIG. 1A, illustrates a perspective view of an inventive Logo Rim, according to a first embodiment of the invention.

The inventive vehicle Logo-Rim apparatus, and a method of making same will now be discussed with reference to FIG. 1A, through FIG. 4. Although the scope of the present invention is much broader than any particular embodiment, a detailed description of the preferred embodiment follows together with drawings. These drawings are for illustration purposes only and are not drawn to scale. Like numbers represent like features and components in the drawings.

Additionally, the embodiments of the present invention relate to a rim device and more particularly to a Logo-Rim that as used to provide automobile enthusiasts with an attractive alternative to ordinary tire rims.

Referring now to the drawings FIG. 1A to FIG. 4, Logo-Rims comprise a line of tire rims which feature a variety of dazzling designs that, pay homage to sports, business, and popular culture logos. Preferably manufactured of polished chrome, aluminum, gold-plated, silver-plated, material, the Logo-Rims may be similar in structure to a standard set of tire rims and may be manufactured in sizes appropriate for various styles and sizes of popular tires, such as, for example, 18 inches, 20 inches, 22 inches, 24 inches, to name a few. Yet, the most notable feature of the Logo-Rims is found in the aforementioned stylish rim designs. These may include, but are not limited to, renderings associated with sporting organizations, such as, for example, the New York Jets, the New York Yankees, business monikers, such as, germane to such powerhouses as Sean John, Ford, fun symbols of popular culture, such as, the iconic "S" within a triangle for Superman, to name a few. As can be imagined, the possibilities for logo-centric designs are virtually limitless. To accommodate vehicles, the Logo-Rims may be marketed and sold, as individuals, a pair, or in sets of four.

There are many benefits and advantages associated with the Logo-Rims Foremost, this invention turns an ordinary automobile into a dazzling showpiece. Providing automobile enthusiasts with a striking and attractive means of improving the appearance of their car. The inventive Logo-Rims also offer a car lover a unique means in which to transform the look of their "ride". Auto lovers who collect vintage classics or who enjoy restoring newer cars may especially appreciate these striking rim designs. Another advantage is that the Logo-Rims provide the car lover a creative means of customizing their automobile to express their very own style and suit their individual personality. Featuring a variety of striking designs, use of the Logo-Rims also provides a classy way in which to state, "I have arrived."

Consumers should appreciate that they would be able to choose from a vast array of striking designs to create a truly unique set of flashy tires. Fully functional, tires would run smoothly and efficiently on the Logo-Rims. The Logo-Rims offer the car enthusiasts a unique means of turning standard tires into attractive and fancy pieces of art. The inventive Logo Rim are very easy to install, and these unique tire rims may almost instantly transform the appearance of any car or truck or vehicle.

The embodiments of the invention described herein are exemplary and numerous modifications, variations and rearrangements can be readily envisioned to achieve substantially equivalent results, all of which are intended to be embraced within the spirit and scope of the invention. Further, the purpose of the abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

FIG. 1A, illustrates a perspective view of an inventive Logo Rim 23, according to a first embodiment of the invention. The Logo Rim 23, comprises of a vehicle rim 10, having an outer rim wall or surface or peripheral external radial surface 13, and an inner rim wall or surface or peripheral internal radial surface 11. For most applications the outer rim wall or surface 13, has an outer rim bead 13A, and an inner rim bead 13B. The outer rim bead 13A, and the inner rim bead 13B, are preferably used to centrally and securely hold the outer peripheral edge 100A, and inner peripheral edge 100B, of a vehicle tire 100, respectively, as more clearly shown in FIG. 3. The inner rim wall or surface 11, has at least two separate rim mating locations 17, to which a corresponding logo outer peripheral edges 15, of a logo 25, or a logo structure 25, are separately secured via at least one securing means 26. The logo structure 25, having at least one logo outer peripheral edge 15, having at least one logo mating location 27, and which peripheral edge 15, are separately secured to the at least two mating locations 17, via the logo mating location 27, using the at least one securing means 26. It is preferred that for most applications the logo 25, is completely secured inside the inner peripheral edges of the vehicle rim 10, and within the inner peripheral rim wall or surface 11, so that the logo 25, does not interfere with the performance of the vehicle to which the Logo Rim 23, is secure to. The logo 25, or the Logo Rim 23, has at least one central opening 20, having an internal wall or surface 12, for the passage of a vehicle wheel hub 75, as more clearly shown in FIG. 3. Optionally, a logo plug 22, could also be used to plug the at least one opening 20. For some applications the logo plug 22, could be slideably, and securely inserted into the at least one opening 20, so as to cover or plug the at least one opening 20. As shown in FIG. 1A, the logo 25, or the Logo Rim 23, comprises of an initial "N" 28, and initial "Y" 29, which could also be an initial or logo of an entity or organization 30, such as, for example, a sports team 30, such as, New York Yankees 30. It should be appreciated that for the ease of understanding the wheel studs 67, which slideably and securely engages with the Logo Rim 23, are more clearly being discussed in FIG. 3.

Figure 1B:
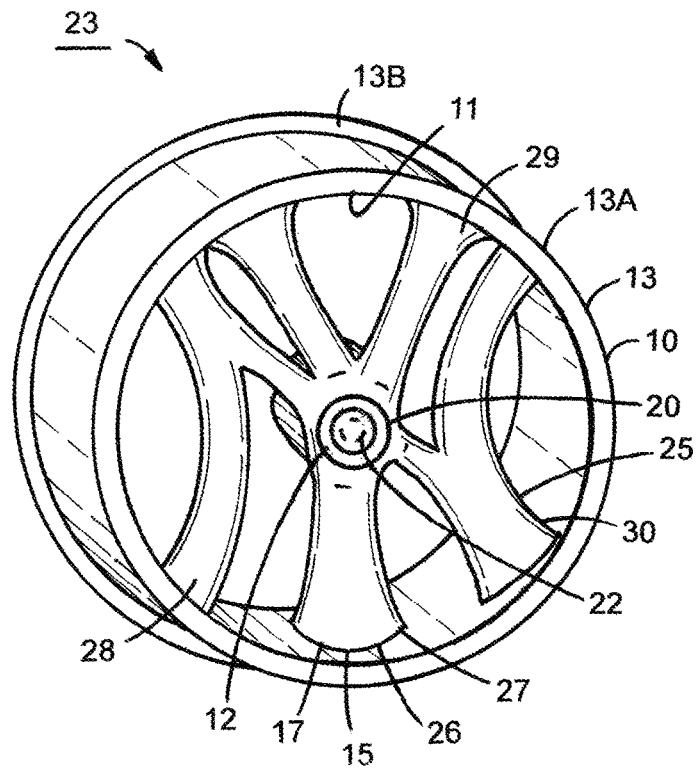
FIG. 1B, illustrates a perspective view of the inventive Logo Rim, of FIG. 1A, with the inventive Logo Plug installed.

FIG. 1B, illustrates a perspective view of the inventive Logo Rim 23, of FIG. 1A, with the inventive Logo plug 22, which has been installed, and is being used to cover or plug the hole or opening 20, and the internal wall or surface 12. The optional logo plug 22, could be used to plug the at least one opening 20, so as to provide continuity to the logo 25, 30, or to supplement the image of the logo 25, 30, or to compliment the image of the logo 25, 30. As one can clearly see in FIG. 1B, that the logo structure 25, having the logo mating location 27, has been securely, and permanently secured or mated or welded to the rim mating location 17, via at least one securing means 26, such as, a weld 26, at several locations.

Figure 2A:
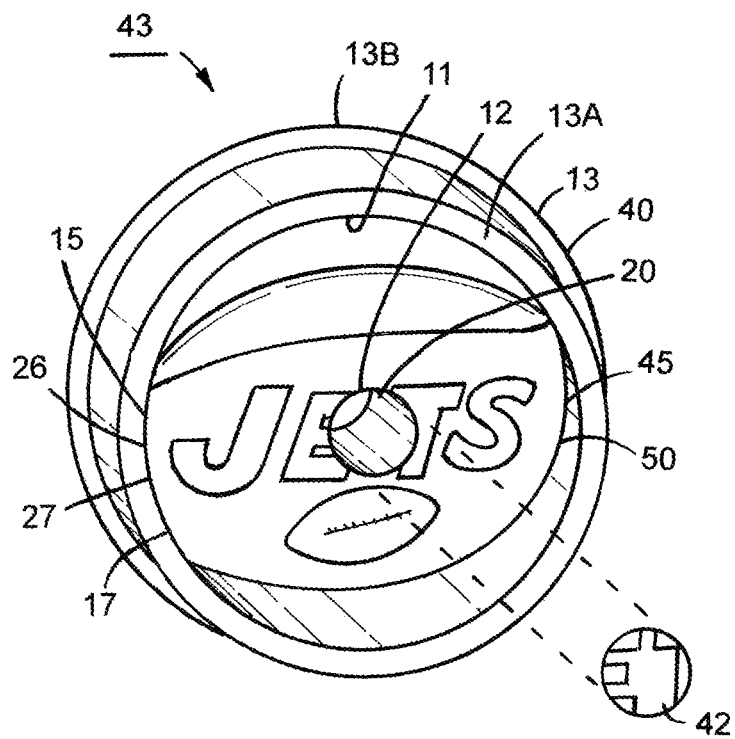
FIG. 2A, illustrates a perspective view of an inventive Logo Rim, according to a second embodiment of the invention.

FIG. 2A, illustrates a perspective view of an inventive Logo Rim 43, according to a second embodiment of the invention. The Logo Rim 43, comprises of a vehicle rim 40, having an outer rim wall or surface or peripheral external radial surface 13, and an inner rim wall or surface or peripheral internal radial surface 11. For most applications the outer rim wall or surface 13, has an outer rim bead 13A, and an inner rim bead 13B. The outer rim bead 13A, and the inner rim bead 13B, are preferably used to centrally and securely hold the outer peripheral edge 100A, and inner peripheral edge 100B, of a vehicle tire 100, respectively, as more clearly shown in FIG. 3. The inner rim wall or surface 11, has at least two separate rim mating locations 17, to which a corresponding logo outer peripheral edges 15, of a logo 45, or logo structure 45, is secured via at least one securing means 26. The logo structure 45, having at least one logo outer peripheral edge 15, having at least one mating location 27, and which peripheral edge 15, are separately secured to the at least two mating locations 17, via the logo mating location 27, using the at least one securing means 26. It is preferred that for most applications the logo 45, is completely secured inside the inner peripheral edges of the vehicle rim 40, and within the inner peripheral rim wall or surface 11, so that the logo 45, does not interfere with the performance of the vehicle to which the Logo Rim 43, is secure to. The logo 45, or the Logo Rim 43, has at least one central opening 20, having an internal wall or surface 12, for the passage of a vehicle wheel hub 75, as more clearly shown in FIG. 3. Optionally, a logo plug 42, could also be used to plug the at least one opening 20. For some applications the logo plug 42, could be slideably, and securely inserted into the at least one opening 20, so as to cover or plug the at least one opening 20. As shown in FIG. 2A, the logo 45, or logo structure 45, comprises of a logo 45, or a slogan 45, or a phrase 45, or a team indicator 45, such as, for example, the New York Jets 50.

Figure 2B:
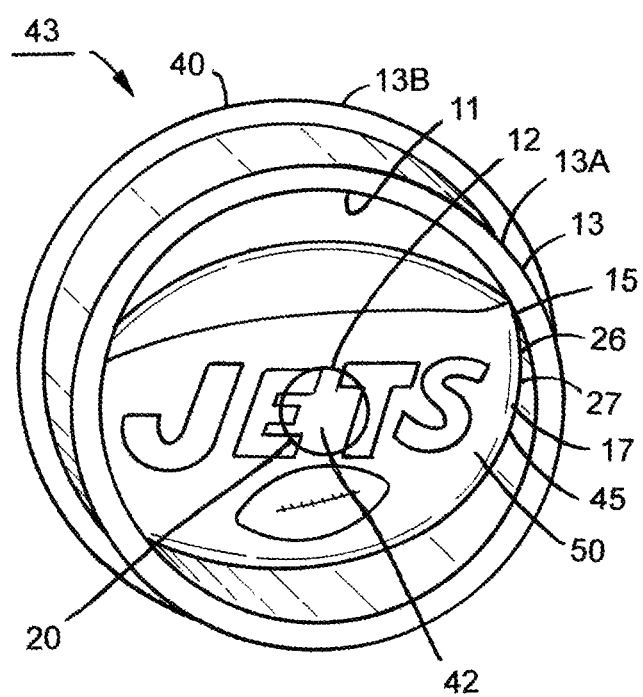
FIG. 2B, illustrates a perspective view of the inventive Logo Rim, of FIG. 2A, with the inventive Logo Plug installed.

FIG. 2B, illustrates a perspective view of the inventive Logo Rim 43, of FIG. 2A, with the inventive Logo plug 42, which has been installed, and is being used to cover or plug the hole or opening 20, and the internal wall or surface 12. The optional logo plug 42, could be used to plug the at least one opening 20, so as to provide continuity to the logo 45, 50, or to supplement the image of the logo 45, 50, or to compliment the image of the logo 45, 50. As one can clearly see in FIG. 2B, that the logo structure 45, having the logo mating location 27, has been securely, and permanently secured or mated or welded to the rim mating location 17, via at least one securing means 26, such as, a weld 26, at several locations, but at at least two locations at each end of the logo structure 45.

Figure 3:
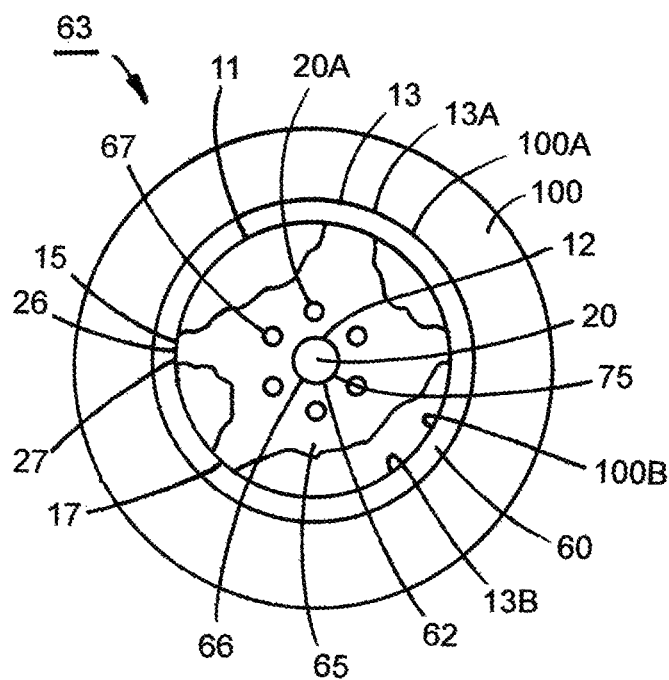
FIG. 3, illustrates a side view of an inventive Logo Rim, according to a third embodiment of the invention.

FIG. 3, illustrates a side view of an inventive Logo Rim 63, according to a third embodiment of the invention. The Logo Rim 63, comprises of a vehicle rim 60, having an outer rim wall or surface or peripheral external radial surface 13, and an inner rim wall or surface or peripheral internal radial surface 11. For most applications the outer rim wall or surface 13, has an outer rim bead 13A, and an inner rim bead 13B. The outer rim bead 13A, and the inner rim bead 13B, are preferably used to centrally and securely hold the outer peripheral edge 100A, and inner peripheral edge 100B, of a vehicle tire 100, respectively. The inner rim wall or surface 11, has at least two rim mating locations 17, to which a logo 65, or logo structure 65, is secured via at least one securing means 26. It is preferred that the logo 65, has at least one logo outer peripheral edge 15, having at least one logo mating location 27, and which peripheral edge 15, is secured to the at least two mating locations 17, via the logo mating location 27, using the at least one securing means 26. It is preferred that for most applications the logo 65, is completely secured inside the inner peripheral edges of the vehicle rim 60, and within the inner peripheral rim wall or surface 11, so that the logo 65, does not interfere with the performance of the vehicle to which the Logo Rim 63, is secure to. The logo 65, or the Logo Rim 63, has at least one central opening 20, having an internal wall or surface 12, for the passage of a vehicle wheel hub 75, and which could optionally be covered by at least one logo plug 62, and/or secured by at least one securing means 66. It should be understood that vehicle wheel hub 75, would slideably and engageably engage with the inside surface of the Logo Rim 23, 43, 63. Additionally, the Logo Rim 23, 43, 63, will have a plurality of wheel stud openings 20A, to slideably and engageably engage with a wheel stud 67. As shown in FIG. 3, the logo 65, comprises of an artistic rendition 65, or a scenery 65, or an abstract feature 65, and combinations thereof, to name a few.

For some applications, as shown in FIG. 3, an optional logo plug 22, 42, 62, could also be used to plug the at least one opening 20, and the internal wall or surface 12, and/or cover the vehicle wheel hub 75. It should be appreciated that the at least one logo plug 22, 42, 62, slideably and engageably covers the wheel hub 75, and the opening 20. For some applications the at least one logo plug 22, 42, 62, could also be used to cover the at least one opening for the wheel studs 20A, and/or the at least one wheel stud 67. For some applications one could also use at least one securing means 66, to secure the at least one logo plug 22, 42, 62, to the logo 25, 45, 65. The at least one securing means 66, could be selected from a group comprising, a screw means 66, a nut and bolt means 66, a tongue and groove means 66, and combinations thereof, to name a few.

Figure 4:
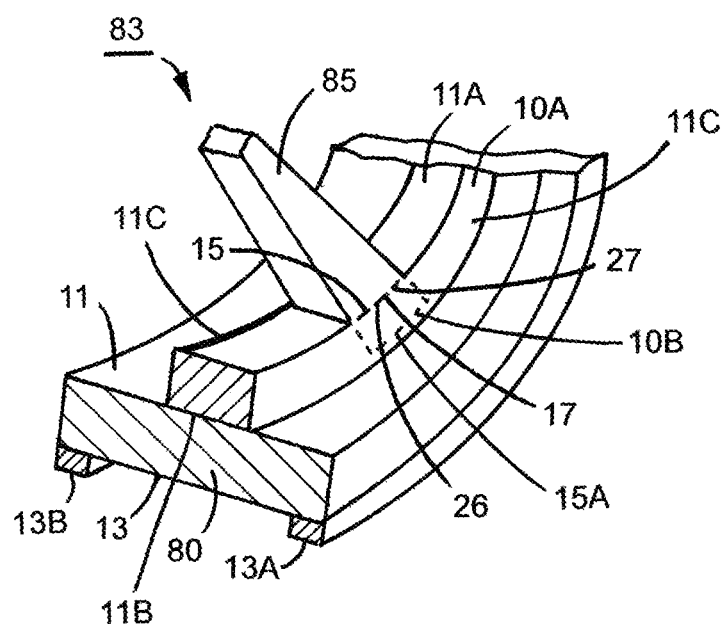
FIG. 4, illustrates a partial perspective view of an inventive Logo Rim, according to a fourth embodiment of the invention.

FIG. 4, illustrates a partial perspective view of an inventive Logo Rim 83, according to a fourth embodiment of the invention. The Logo Rim 83, comprises of a vehicle tire rim 80, having an outer rim wall or surface or peripheral external radial surface 13, and an inner rim wall or surface or peripheral internal radial surface 11, and optionally further having at least one internal radial mini-rim ring 10A, having a mini-rim outer wall or surface or peripheral external radial surface 11A, and a mini-rim inner wall or surface or peripheral internal radial surface 11B, and a mini-rim side wall or surface or peripheral radial side surface 11C. The mini-rim inner wall 11B, would be secured to or integrated into the inner rim wall 11. However, for some applications the mini-rim inner wall 11B, could be a part of or an extension of the inner rim wall 11, and thus creating the mini-rim ring 10A. It should be appreciated that the at least one mini-rim ring 10A, provides additional structure and safety to the vehicle tire rim 80. Thus, for most applications, it is preferred that the at least one mini-rim-ring 10A, is secured or placed in the central portion of the peripheral internal radial surface 11, of the vehicle tire rim 80. It should be understood that the logo outer peripheral edge 15, of a logo 85, would be mated with or secured to the mating location 27, of the at least one mini-rim ring 10A, using at least one securing means 26. For most applications the outer rim wall or surface 13, has an outer rim bead 13A, and an inner rim bead 13B. The outer rim bead 13A, and the inner rim bead 13B, are preferably used to centrally and securely hold the outer peripheral edge 100A, and inner peripheral edge 100B, of a vehicle tire 100, respectively, as more clearly shown in FIG. 3. The inner rim wall or surface 11, has at least two rim mating locations 17, to which a logo 85, or logo structure 85, is secured via at least one securing means 26. It is preferred that the logo 85, has at least one logo outer peripheral edge 15, having at least one logo mating location 27, and which peripheral edge 15, is secured to the at least two mating locations 17, via the logo mating location 27, using the at least one securing means 26. It is preferred that for most applications the logo 85, is completely secured inside the inner peripheral edges of the vehicle rim 80, and within the inner peripheral rim wall or surface 11, so that the logo 85, does not interfere with the performance of the vehicle to which the Logo Rim 83, is secure to. The logo 85, or the Logo Rim 83, has at least one central opening 20, having an internal wall or surface 12, for the passage of a vehicle wheel hub 75. It should be understood that vehicle wheel hub 75, would slideably and engageably engage with the inside surface of the Logo Rim 23, 43, 63, 83. Additionally, the Logo Rim 23, 43, 63, 83, will have a plurality of wheel stud openings 20A, to slideably and engageably engage with a wheel stud 67, as more clearly shown in FIG. 3.

For some applications, as shown in FIG. 4, one could also optionally have an extension or protrusion or leg 15A, of the logo outer peripheral edge 15, that would be secured to the mini-rim side wall or surface or peripheral radial side surface 11C, of the at least one internal radial mini-rim ring 10A. Thus, for some applications the logo outer peripheral edge 15, of the logo 85, would be fully or partially secured to the mini-rim side wall surface 11C, such as, for example, by welding 26. However, for some applications the at least one internal radial mini-rim ring 10A, could have at least one blind hole 10B, which would be used to accommodate the extension or protrusion or leg 15A, of the logo outer peripheral edge 15, and be secured thereto by at least one securing means 26, such as, for example, welding 26.

It should be appreciated that the at least one securing means 26, could be selected from a group comprising a weld 26, a spot weld 26, a partial weld 26, a fusing of two materials 26, a spot fuse 26, a partial fusing of two materials 26, an integration 26, of two materials to form a continuous material, a permanent integration 26, of the logo edge or mating location 27, with the rim mating location 17, to name a few.

Because of the stresses imposed by a vehicle on the rims 10, 40, 60, 80, and tires 100, of an automobile the logo 25, 45, 65, 85, or logo structure 25, 45, 65, 85, that is contained inside the wheel rim 10, 40, 60, 80, should be able to withstand such stresses, therefore the logo rim ends or mating location 17, 27, that mate with the inner peripheral walls 11, of the rim 10, 40, 60, 80, should preferably be in the center and the securing of the same should be such that the logo 25, 45, 65, 85, does not move from the securing location 17, 27, or the inner peripheral walls 11, of the tire-rim 10, 40, 60, 80, does not slide away from the logo 25, 45, 65, 85, that is secured thereto. For some embodiments for the protection of the logo 25, 45, 65, 85, that is secured inside the tire-rim 10, 40, 60, 80, should be such that the complete logo 25, 45, 65, 85, is enveloped inside the tire-rim envelope or the planar surfaces of the tire-rim outer edges 13A, 13B, such that, the logo 25, 45, 65, 85, does not protrude out of the plane of the rim edges 13A, 13B, this non-protrusion would also protect the logo edges or the logo surfaces from being chipped or damaged by the debris that might be generated by the rotation of the tires 100.

The logo 25, 45, 65, 85, or logo structure 25, 45, 65, 85, that is contained inside the inner peripheral wall or rim 11, or peripheral internal radial surface 11, can be selected from a group comprising an alphabet, an initial, a number, a team name, a team logo, a slogan, a phrase, a scenery, an artistic feature, an animal depiction, and combinations thereof, to name a few.

The material for the vehicle rim 10, 40, 60, 80, and/or the logo 25, 45, 65, 85, or logo structure 25, 45, 65, 85, is selected from a group comprising a metallic material, an alloy material, a chrome material, a stainless steel material, a magnesium material, an aluminum material, an alloy of magnesium and aluminum, a gold-plated material, a silver-plated material, a composite material, a material having at least one coating of Teflon, and combinations thereof, to name a few.

The at least one securing means 26, is selected from a group comprising, a weld, a screw means, a nut and bolt means, a tongue and groove means, and combinations thereof, to name a few.

It should also be appreciated and understood that the vehicle rim 10, 40, 60, 80, and the logo 25, 45, 65, 85, or logo structure 25, 45, 65, 85, could be made as a one-piece structure or unit, such as, by injection molding or casting, which methods are well understood and established in the art, or similar other means, which are well-known, and such techniques and methods are incorporated herein by reference. Injection molding can be performed with a host of materials, including, metals, (for which the process is also called die-casting). Material for the part is fed into a heated barrel, mixed, and forced into a mold cavity, where it cools and hardens to the configuration of the cavity. After a product is designed, molds are made by a mold-maker, or toolmaker, from metal, usually either steel or aluminum, and precision-machined to form the features of the desired part. Injection molding is widely used for manufacturing a variety of parts. However, advances in 3D printing technology also would allow the production of the vehicle rim 10, 40, 60, 80, and the logo 25, 45, 65, 85, or logo structure 25, 45, 65, 85, being made as a one-piece structure or unit, and such 3D printing techniques are incorporated herein by reference.

Thus, the present invention is not limited to the embodiments described herein and the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Still further, while certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

It should be further understood that throughout the specification and claims several terms have been used and they take the meanings explicitly associated herein, unless the context clearly dictates otherwise. For example, the phrase "in one embodiment" as used herein does not necessarily refer to the same embodiment, though it may. Additionally, the phrase "in another embodiment" as used herein does not necessarily refer to a different embodiment, although it may. Thus, various embodiments of the invention may be readily combined, without departing from the scope or spirit of the invention.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A wheel for an automotive vehicle, comprising:
   (a) a tire rim hub having a central opening for mounting to an axle of an automotive vehicle via a wheel hub;
   (b) a tire rim disposed radially outward from said tire rim hub and being configured for receiving a tire on its peripheral external radial wall surface, said tire rim having an inner rim wall to receive a mini-rim, and wherein said tire rim and said mini-rim are separate each from the other;
   c) said at least one mini-rim having a mini-rim inner wall, a mini-rim outer wall, mini-rim side wall, and wherein said mini-rim outer wall has at least one blind hole, and wherein said mini-rim inner wall is directly secured to said inner rim wall of said tire rim;
   (d) at least one support structure extending between said tire rim hub and a peripheral internal radial wall surface of said tire rim, and wherein said at least one support structure is in physical contact and secured inside said at least one blind hole within said mini-rim outer wall at at least two different locations, such that said mini-rim is positioned between an end of said at least one support structure and said peripheral internal radial wall surface of said tire rim; and
   (e) wherein at least an external portion of said at least one support structure is configured to represent at least one logo.

2. The Wheel for an automotive vehicle of claim 1, wherein said tire rim hub is integrated into and is a part of said at least one logo.

3. The wheel for an automotive vehicle of claim 1, wherein at least one logo plug slideably and engageably covers said tire rim hub central opening.

4. The wheel for an automotive vehicle of claim 1, wherein at least one logo plug slideably and engageably covers said tire rim hub central opening, and at least one securing means secures said at least one logo plug to said at least one logo.

5. The wheel for an automotive vehicle of claim 1, wherein at least one logo plug slideably and engageably covers said tire rim hub central opening, and at least one securing means secures said at least one logo plug to said at least one logo, and wherein said at least one securing means is selected from a group consisting of a screw means, a nut and bolt means, a tongue and groove means, and combinations thereof.

6. The wheel for an automotive vehicle of claim 1, wherein said at least one logo contained inside said inner peripheral radial rim wall is selected from a group consisting of an alphabet, an initial, a number, a team name, a team logo, a slogan, a phrase, a scenery, an artistic feature, an animal depiction, and combinations thereof.

7. The wheel for an automotive vehicle of claim 1, wherein material for said at least one logo is selected from a s group consisting of a metallic material, an alloy material, a chrome material, a stainless steel material, a magnesium material, an aluminum material, an alloy of magnesium and aluminum, a gold-plated material, a silver-plated material, a composite material, a material having at least one coating of PTFE, and combinations thereof.

8. The wheel for an automotive vehicle of claim 1, wherein material for said tire rim hub is selected from a group consisting of a metallic material, an alloy material, a chrome material, a stainless steel material, a magnesium material, an aluminum material, an alloy of magnesium and aluminum, a gold-plated material, a silver-plated material, a composite material, a material having at least one coating of PTFE, and combinations thereof.

9. The wheel for an automotive vehicle of claim 1, wherein material for said mini-rim is selected from a group consisting of a metallic material, an alloy material, a chrome material, a stainless steel material, a magnesium material, an aluminum material, an alloy of magnesium and aluminum, a gold-plated material, a silver-plated material, a composite material, a material having at least one coating of PTFE, and combinations thereof.

10. The wheel for an automotive vehicle of claim 1, wherein material for said tire rim is selected from a group consisting of a metallic material, an alloy material, a chrome material, a stainless steel material, a magnesium material, an aluminum material, an alloy of magnesium and aluminum, a gold-plated material, a silver-plated material, a composite material, a material having at least one coating of PTFE, and combinations thereof.

11. The wheel for an automotive vehicle of claim 1, wherein said at least one support structure is secured via at least one securing means selected from a group consisting of a weld, a screw means, a nut and bolt means, a tongue and groove means, and combinations thereof.

* * * * *